United States Patent
Klee et al.

(10) Patent No.: US 10,516,275 B2
(45) Date of Patent: Dec. 24, 2019

(54) RECHARGEABLE BATTERY PACK FOR A HAND-HELD POWER TOOL AND/OR A CHARGING DEVICE

(71) Applicant: Robert Bosch GmbH, Stuttgart (DE)

(72) Inventors: Christoph Klee, Stuttgart (DE); Mickael Segret, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/604,010

(22) Filed: May 24, 2017

(65) Prior Publication Data

US 2017/0353041 A1  Dec. 7, 2017

(30) Foreign Application Priority Data

Jun. 3, 2016  (DE) .......................... 10 2016 209 822

(51) Int. Cl.
*H02J 7/00* (2006.01)
*H01M 10/00* (2006.01)
*H01M 10/42* (2006.01)

(52) U.S. Cl.
CPC ......... *H02J 7/0009* (2013.01); *H01M 10/425* (2013.01); *H02J 7/0006* (2013.01); *H02J 7/0021* (2013.01); *H01M 2010/4278* (2013.01); *H01M 2220/30* (2013.01); *H02J 7/0003* (2013.01); *H02J 2007/0096* (2013.01)

(58) Field of Classification Search
None
See application file for complete search history.

(56) References Cited

U.S. PATENT DOCUMENTS

| | | | | |
|---|---|---|---|---|
| 4,006,396 A * | 2/1977 | Bogut | ....................... | G05F 1/56 320/106 |
| 5,206,097 A * | 4/1993 | Burns | ................ | G01R 31/3648 320/114 |
| 5,325,040 A * | 6/1994 | Bogut | ................... | H02J 7/0068 320/150 |
| 5,742,149 A * | 4/1998 | Simpson | ............... | H02J 7/0004 320/107 |
| 5,905,358 A * | 5/1999 | Fernandez | ............ | H02J 7/0008 320/106 |

(Continued)

*Primary Examiner* — Leigh M Garbowski
(74) *Attorney, Agent, or Firm* — Norton Rose Fulbright US LLP; Gerard Messina (57) ABSTRACT

A rechargeable battery pack including at least one interface for establishing a mechanical and/or electrical connection of the rechargeable battery pack to a hand-held power tool and/or a charging device. The interface includes contact elements for the electrical and/or mechanical contacting of corresponding contact elements on the hand-held power tool and/or corresponding contact elements on the charging device, at least one contact element being a signal contact element electrically connected to a coding element. The rechargeable battery pack also includes a rechargeable battery pack electronics system configured for providing information regarding the rechargeable battery pack via the signal contact element, and storing at least in part in the coding element, and a microcontroller connected to the rechargeable battery pack electronics system in such a way that the microcontroller detects when information is called up at the signal contact element by a hand-held power tool and/or by a charging device.

16 Claims, 5 Drawing Sheets

(56) References Cited

U.S. PATENT DOCUMENTS

| | | | | |
|---|---|---|---|---|
| 5,939,856 A * | 8/1999 | Demuro | H02J 7/0006 | 320/106 |
| 6,218,806 B1 * | 4/2001 | Brotto | H02J 7/0004 | 320/106 |
| 6,288,521 B1 * | 9/2001 | Meador | H02J 7/0019 | 320/118 |
| 6,489,750 B2 | 12/2002 | Hebding | H02J 7/0052 | 320/139 |
| 7,138,785 B2 * | 11/2006 | Brotto | H02J 7/0004 | 320/106 |
| 7,253,585 B2 * | 8/2007 | Johnson | H01M 2/1055 | 320/112 |
| 7,452,234 B2 * | 11/2008 | Ma | H01R 13/6582 | 439/382 |
| 7,525,280 B2 * | 4/2009 | Fagan | H02J 7/0009 | 320/106 |
| 7,692,408 B2 * | 4/2010 | Miyazaki | H02J 7/0042 | 320/106 |
| 8,242,746 B2 * | 8/2012 | Austerschulte | G01R 31/3658 | 320/120 |
| 8,513,922 B2 * | 8/2013 | Yang | H02J 7/0026 | 320/116 |
| 9,219,375 B2 * | 12/2015 | Woods | H01M 10/4221 | |
| 9,620,989 B2 * | 4/2017 | Meoli | H02J 7/027 | |
| 9,878,432 B2 * | 1/2018 | Linehan | B25F 5/00 | |
| 9,908,182 B2 * | 3/2018 | Phillips | B25F 5/00 | |
| 2002/0101218 A1 * | 8/2002 | Koenck | G01R 31/3655 | 320/140 |
| 2013/0255980 A1 * | 10/2013 | Linehan | B25F 5/00 | 173/2 |
| 2013/0335013 A1 * | 12/2013 | Suzuki | H01M 2/1055 | 320/107 |
| 2015/0200553 A1 * | 7/2015 | Endo | H01M 2/1072 | 320/134 |

* cited by examiner

RECHARGEABLE BATTERY PACK FOR A HAND-HELD POWER TOOL AND/OR A CHARGING DEVICE

CROSS REFERENCE

The present application claims the benefit under 35 U.S.C. § 119 of German Patent Application No. DE 102016209822.5 filed on Jun. 3, 2016, which is expressly incorporated herein by reference in its entirety.

FIELD

The present invention relates to a rechargeable battery pack for a hand-held power tool and/or a charging device, as well as to a tool system.

BACKGROUND INFORMATION

Electrical hand-held power tools, such as, for example, impact screwdrivers, drills, angle grinders, jigsaws, circular saws or planers for use by skilled workers or do-it-yourselfers usually include either an AC motor or a DC motor as the drive motor. While the former is generally supplied with AC current from the power supply network via a power cord, the electrical energy for supplying the DC motor generally originates from a so-called rechargeable battery pack, a rechargeable accumulator in a housing which is coupleable to the housing of the hand-held power tool and which is electrically connected to the power supply lines of the DC motor when the two housings are coupled.

Rechargeable battery packs may include rechargeable accumulators, generally a plurality of battery cells connected in a parallel and/or series circuit. Herein, a rechargeable battery pack is therefore understood to be an accumulator pack which is preferably made up of several electrically interconnected battery cells and may store electrical energy, which delivers the energy necessary for the operation of the hand-held power tool, and is exchangeably accommodated in a chamber, an interface, or the like of the hand-held power tool. The electrical contacting takes place mostly in the area of a locking device.

Conventional charging devices for rechargeable battery packs may include a charging electronics system which is situated in a housing and includes a receptacle for a rechargeable battery pack to be charged and an interface situated in the area of the receptacle and includes contact elements for contact elements of the rechargeable battery pack. The electrical recharging of a rechargeable battery pack is possible with the aid of such charging devices.

Furthermore, in conventional tool systems may, either one type of rechargeable battery pack may be utilized with many different hand-held power tools or, conversely, one hand-held power tool may be operated with the aid of different types of rechargeable battery packs. In this case, it may be important, in principle, that the hand-held power tool and/or the charging device have information regarding the rechargeable battery pack, such as, for example, the maximum charging and discharging current, the present operating temperature, and/or the internal resistance of the rechargeable battery pack. Present-day rechargeable battery pack systems are controlled by management systems, which monitor the cells and regulate the charging and discharging current. The objective of such conventional methods is always to extend the service life of the rechargeable battery pack under consideration of the system parameters of the rechargeable battery system, almost all noteworthy manufacturers of power tools generally offering their own charging technology for their rechargeable battery packs, so that both the charging devices as well as the hand-held power tools are specially configured for the geometry and power data of the rechargeable battery pack offered by the manufacturer.

Different conventional systems provide the hand-held power tool and/or the charging device with the required information regarding the installed rechargeable battery pack. In this way, an electrical coding is installed, for example, in the rechargeable battery pack itself with the aid of coding resistors, which are measured by the hand-held power tool and/or the charging device. Coding resistors have the disadvantage that one additional contact per resistor is generally necessary between the hand-held power tool and/or the charging device and the rechargeable battery pack. This has the disadvantage that the electrical coding with the aid of resistors only allows for a limited number of codings, whereby a future compatibility is limited, since the corresponding parameter sets must be established in the reading-out device during manufacture. If such a resistor is corrupted, e.g., due to damage resulting from ESD, an increased transfer resistance at the contact, or contaminations, a misinterpretation of the coding element by the hand-held power tool and/or the charging device is possible, so that, for example, charging may not be carried out with the maximum permitted current, whereby a longer charging time is required, or the maximum permitted current may not be discharged, whereby the tool operates using reduced power. Furthermore, due to limited measuring accuracy, only a limited number of different coding resistors are distinguishable in the hand-held power tool and/or the charging device.

Such a system is highly cost-effective, and it was therefore frequently utilized in the past, and whereby many tool systems including a hand-held power tool and/or a charging device and a rechargeable battery pack which utilize this technology, are presently available on the market.

Alternatively, the interface between the rechargeable battery pack and the hand-held power tool and/or the charging device may be a digital interface, e.g., a single-wire interface, in which an electrical coding also lies at high potential via a data bus and/or via a pull-up resistor, and is pulled to ground by the communication partners in accordance with the bus protocol definition. In this case, the hand-held power tool and/or the charging device exchange the required information with the rechargeable battery pack via an additional data contact and with the aid of established transmission protocols. The bus system improves the disadvantage of the electrical coding via resistors, since the rechargeable battery pack may also transmit parameter values which are not known in advance. The bus system has the disadvantage, however, that additional contacts are still required, and the rechargeable battery pack also requires a separate intelligent electronics system. Such rechargeable battery packs may automatically gather data during use, for example, regarding the number of charging cycles. Although these data may be helpful during diagnosis in the event of an error, digital interfaces are technically more complex, since they require an intelligent electronics system on both sides. Furthermore, which data are stored is already established during the manufacture of the rechargeable battery pack. This specification may not be changed at a later time.

In the case of the aforementioned systems, it may be disadvantageous, in particular, that a hand-held power tool and/or a charging device and/or a rechargeable battery pack including a digital interface is not compatible with a conventional rechargeable battery pack, which includes a mechanical or electrical coding with the aid of coding resistors.

SUMMARY

An object of the present invention is to provide a rechargeable battery pack for a hand-held power tool and/or a charging device, which is optimized and which is compatible with hand-held power tools and/or charging devices which are already on the market as well as newer hand-held power tools and/or charging devices.

This object may be achieved by a rechargeable battery pack for a hand-held power tool and/or a charging device in accordance with the present invention and by a tool system in accordance with the present invention. Advantageous embodiments, variants, and refinements of the present invention are described herein.

According to an example embodiment of the present invention, it is provided that a rechargeable battery pack includes at least one interface for establishing a mechanical and electrical connection of the rechargeable battery pack to a hand-held power tool and/or a charging device. The interface includes contact elements for the electrical and/or mechanical contacting of corresponding contact elements on the hand-held power tool and/or corresponding contact elements on the charging device, at least one contact element being a signal contact element, which is electrically connected to a coding element of the rechargeable battery pack. Furthermore, the rechargeable battery pack includes a rechargeable battery pack electronics system, the rechargeable battery pack electronics system being configured for providing information regarding the rechargeable battery pack via the signal contact element, at least a portion of the information regarding the rechargeable battery pack being stored in the coding element. Moreover, the rechargeable battery pack includes a microcontroller, the microcontroller being connected to the rechargeable battery pack electronics system in such a way that the microcontroller detects when information is called up at the signal contact element by a hand-held power tool and/or by a charging device. In this way, it may be ensured that the microcontroller is capable of checking whether the coding element is presently being read out by the hand-held power tool and/or the charging device. The hand-held power tool and/or the charging device and the rechargeable battery pack may communicate with each other regarding this at a digital level, so that a rechargeable battery pack according to the present invention is compatible with hand-held power tools and/or charging devices which are already on the market as well as newer hand-held power tools and/or charging devices, no additional contact elements being required between the rechargeable battery pack and the hand-held power tool and/or the charging device, since a new charging device or a new hand-held power tool may still measure and evaluate the coding element, and a new rechargeable battery pack still provides a coding element for an old charging device and an old hand-held power tool.

In one preferred specific embodiment of the present invention, the at least one coding element is a coding resistor, the coding value being the resistance value of the coding resistor. It is very particularly preferred when the coding resistor is an ohmic resistor and the coding value is the ohmic resistance value, the means for detecting the coding value including, in this case, an ohmic measuring shunt connected to a measuring DC voltage. Alternatively, the coding element may also be an RC element, a capacitor, an inductor, a diode, a Zener diode, or a combination thereof.

In one particularly preferred specific embodiment, the microcontroller is connected to the rechargeable battery pack electronics system in such a way that the information provided at the signal contact element may be influenced by the microcontroller, so that data which were not yet defined during the manufacture of the rechargeable battery pack may be stored in the rechargeable battery pack.

In one preferably simple specific embodiment of the present invention, the rechargeable battery pack electronics system is configured in such a way that the microcontroller influences the information provided at the signal contact element by short-circuiting the coding element to ground, the hand-held power tool and/or the charging element being capable of supplying the coding element with current for a measurement. The resistance value of the coding resistor is ascertainable via the measured voltage.

In one particularly preferred specific embodiment, the microcontroller is configured for gathering data regarding the rechargeable battery pack, in particular regarding the operation of the rechargeable battery pack, and for storing these in a memory integrated into the rechargeable battery pack. The information (e.g., number of charging cycles) collected by the rechargeable battery pack may be queried by the hand-held power tool and/or the charging device. In one particularly preferred specific embodiment, the data may therefore be stored at an established address and/or flexibly in the memory. Therefore, it is possible that previously defined parameters have already been transmitted by the manufacturer and/or by the hand-held power tool and/or the charging device into the rechargeable battery pack and stored therein. Additionally or alternatively, flexible data may also be transmitted by the manufacturer and/or by the hand-held power tool and/or the charging device and/or by the user into the rechargeable battery pack and stored therein. Preferably, the address in the memory corresponds to the meaning of the data set, the name of a parameter and the content of the parameter being transmitted and stored in each case. In this way, it is possible to store, e.g., 25 2-byte data words having 2-byte names, i.e., 25 of 65536 possible data words, in one small memory of, for example, 100 bytes. This makes it possible to also define data words long after a sale of the rechargeable battery pack, which may then be stored by a newer hand-held power tool and/or a newer charging device in the rechargeable battery pack and read out therefrom. In this way, the rechargeable battery pack becomes a flexible, external data memory for the hand-held power tool and/or the charging device. In this case, it is decisive that the rechargeable battery pack receives and subsequently provides data, at least some of which were not generated or gathered by the rechargeable battery pack, but rather which are stored by the manufacturer and/or by the user in the data memory of the rechargeable battery pack and/or the charging device and/or the hand-held power tool.

Particularly advantageously, the gathered and stored data relate to present operating states, in particular individual cell voltages and/or the present temperature of the rechargeable battery pack and/or to the progress of operating states of the rechargeable battery pack, in particular a number of charge cycles. In general, present operating states may also be understood to be rechargeable battery pack parameters such as, for example, an end-point voltage of the rechargeable battery pack, a power class of the rechargeable battery pack, a number of cells of the rechargeable battery pack, and/or utilized cell chemicals of the rechargeable battery pack. In this case, a power class may be understood to be, primarily, the different DC voltages of the rechargeable battery packs, for example of 3.6 volts, 7.2 volts, 10.8 volts, 14.4 volts, 18 volts or 36 volts, and/or the current carrying capacity (ampacity) of the pack during charging and discharging.

Advantageously, the microcontroller is configured for outputting data from the integrated memory, in the form of the information provided at the signal contact element, to a control unit of the hand-held power tool and/or a charging electronics system of the charging device.

Preferably, the data are at least partially redundant with the information stored in the coding element. The required information, such as, for example, the maximum charging current and/or critical information regarding the individual-cell state, are additionally digitally transmitted. A secure transmission of information between the rechargeable battery pack and the hand-held power tool and/or the charging device may be made possible in this way.

In one particularly preferred specific embodiment, the microcontroller is configured for receiving data from a control unit of the hand-held power tool and/or from a charging electronics system of the charging device and storing these data in the integrated memory, so that data from the hand-held power tool and/or the charging device may also be stored in the rechargeable battery pack and may be made available again. In one particularly advantageous embodiment, the hand-held power tool and/or the charging device may establish, for example, a connection to a data network and transmit the information to this data network and store these data therein, without the need for the rechargeable battery pack to have such a connection.

In yet another preferred specific embodiment, the microcontroller is configured for receiving, via the signal contact element, control commands related to the rechargeable battery pack from the control unit of the hand-held power tool and/or from the charging electronics system of the charging device and, if necessary, storing these commands in the integrated memory. In this way, for example, the charging electronics system of the charging device and/or the control unit of the hand-held power tool may initiate a balancing of the rechargeable battery pack, as long as the switching means required for this purpose are available.

Furthermore, the object may be achieved by a tool system in accordance with an example embodiment of the present invention, the tool system including a rechargeable battery pack according to the present invention, a charging device, and/or a hand-held power tool. The charging device and/or the hand-held power tool each include an interface for the electrical and/or mechanical coupling of the rechargeable battery pack to the charging device and/or the hand-held power tool, the charging device including a charging electronics system and/or the hand-held power tool including a control unit. The charging electronics system and/or the control unit are/is configured for receiving and/or outputting data from the integrated memory of the rechargeable battery pack and/or information regarding the rechargeable battery pack via the signal contact element.

The charging electronics system of the charging device and/or the control unit of the hand-held power tool are/is furthermore configured for evaluating the received data and sending control commands to the rechargeable battery pack. In this way, control commands of the charging electronics system of the charging device and/or the control unit of the hand-held power tool may be transmitted to the rechargeable battery pack. In this way, it is possible that, for example, a charge state indicator, which is part of the rechargeable battery pack, may be controlled via these control commands, in order to provide the user with general information regarding the rechargeable battery pack. Advantageously, the control commands are at least partially based on the evaluation of the received data.

Advantageously, a certain control command output by the charging electronics system of the charging device and/or the control unit of the hand-held power tool effectuates a permanent or temporally limited locking of the rechargeable battery pack in this case when, for example, an unsafe or insufficient state of the rechargeable battery pack is detected.

In one particularly preferred specific embodiment, the information transmitted via the signal contact element relates to at least one of the parameters of end-point voltage of the rechargeable battery pack, power class of the rechargeable battery pack, end-of-charge voltage of the rechargeable battery pack, number of cells of the rechargeable battery pack, or utilized cell chemicals of the rechargeable battery pack.

In general, a hand-held power tool, as used herein, is understood to be all hand-held power tools including a tool carrier, which may be set into rotation or translation and which is directly drivable by a drive motor via a gear or a planetary gear set, such as, for example, baton screw drivers, cordless drills, hammer drills, multi-function tools, saws, shears, sanders, and/or drill-screwdrivers, as well as their system accessories, such as, for example, lamps, welding devices, lasers, measuring devices, or blowers or vacuums, which may be operated using the same rechargeable battery packs. In this context, "transmission of electrical energy" is to be understood, in particular, to mean that the hand-held power tool is supplied with energy via the rechargeable battery pack.

Further features, possible applications, and advantages of the present invention result from the following description of exemplary embodiments of the present invention, which are represented in the figures. It should be noted that the represented features merely have a descriptive character and may also be used in combination with features of other above-described refinements and are not intended to restrict the present invention in any way.

BRIEF DESCRIPTION OF THE DRAWINGS

The present invention is explained in greater detail below with reference to preferred exemplary embodiments, identical reference numerals being used for identical features.

DETAILED DESCRIPTION OF EXAMPLE EMBODIMENTS

Figure 1:
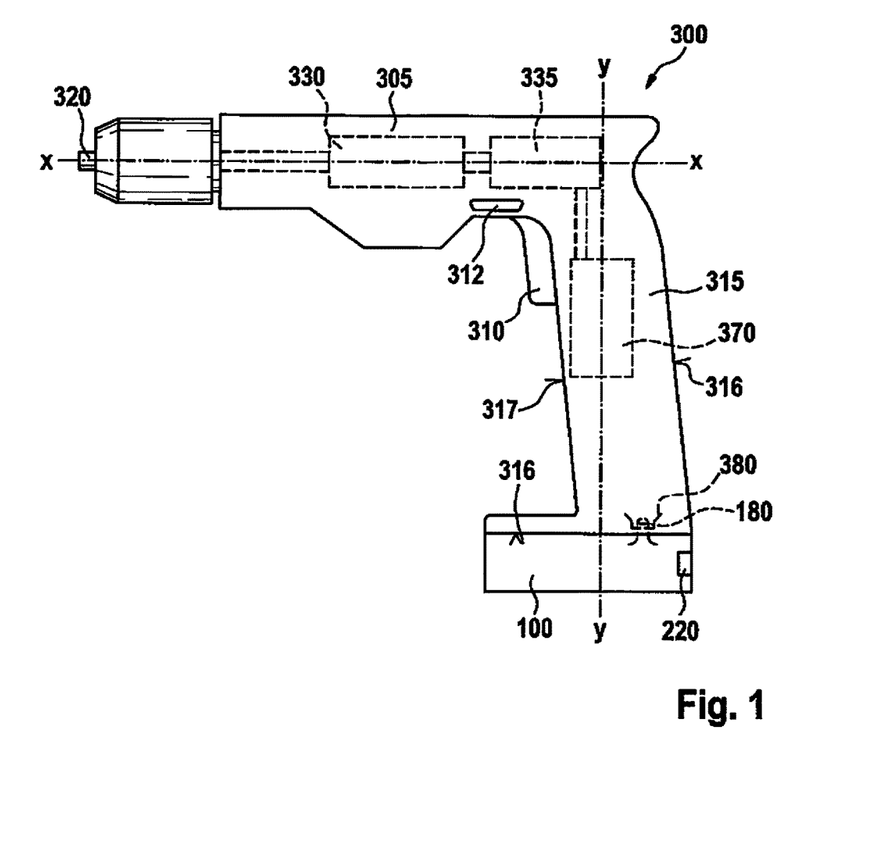
FIG. 1 shows a view of a hand-held power tool including a rechargeable battery pack according to the present invention, by way of example.

FIG. 1 shows an electrical device configured as hand-held power tool 300, which is configured as a cordless drill-screwdriver, by way of example. In the represented specific embodiment, hand-held power tool 300 is therefore mechanically and electrically connected to a rechargeable battery pack 100 for battery-supplied power. It is pointed out, however, that the present invention is not restricted to cordless drill-screwdrivers, but rather may be utilized with different hand-held power tools 300, independently of whether the hand-held power tools are operated with the aid of a rechargeable battery pack 100 as the battery-supplied power, as represented, or possibly additionally with the aid of mains-supplied power. Hand-held power tool 300 includes a gear 330 situated in a housing 305 for transmitting a torque generated by a drive motor 335 to a drive shaft, which is rotating about an axis x and on which a tool holder 320 for a tool (not depicted) is fastened, and includes a handle 315. An electronics system 370 is situated within housing 305 and is in electronic and mechanical contact with drive motor 335 and/or gear 330. Handle 315 is utilized as a support surface for a hand of an operator of hand-held power tool 300 and generally has a longitudinal axis y, a front side 317, which faces in the direction of tool holder 320 along an axis x, a back side 316, and two lateral faces.

A first operating element 310 for the energy supply of drive motor 335 is situated in the area of handle 315, first operating element 310 protruding from housing 305 so as to be manually accessible by the user, so that a control and/or regulation of the drive motor may be made possible preferably as a function of the displacement path of first operating element 310 in a way which is known per se by way of a pushing movement of first operating element 310, and the voltage supply for drive motor 335 may also be switched on and/or off. Furthermore, hand-held power tool 300 includes a second operating element 312 in the form of a slide switch for adjusting the direction of rotation of drive motor 335 of hand-held power tool 300. Second operating element 312 is movably situated perpendicular to rotational axis x of the drive shaft, in particular of tool holder 320 of hand-held power tool 300, so that second operating element 312, upon actuation, may be moved back and forth between a first position, a second position, and a third position. In this case, the first and the second positions each establish a direction of rotation of the drive motor. The user of hand-held power tool 300 may therefore detect in which working mode hand-held power tool 300 is operating based simply on the positions of second operating element 312. In addition, the second switch element includes a third position between the first position and the second position, for example, a middle position, an electrical, electromechanical, and/or mechanical interruption of the motor current taking place in the third position. In this way, for example, the operation of first switch element 310 may be mechanically blocked, second operating element 312 acting upon first switch element 310 in a locking way when moved into a third position. In this case, second operating element 312 may be designed as a slide switch, as represented, or, alternatively, as a toggle switch.

First operating element 310 and second operating element 312 are situated along rotational axis x in such a way that it is possible to actuate both first and second operating elements 310, 312 using the index finger or the middle finger. In this case, the distance between first operating element 310 and second operating element 312 is selected in such a way that a single-handed operation of hand-held power tool 300 is possible. The two operating elements 310, 312 are furthermore situated in an area underneath rotational axis x and protrude from housing 305.

In the position shown in FIG. 1, rechargeable battery pack 100 is fastened on handle 315 of hand-held power tool 300 and is locked with the aid of locking means. Due to the arrangement of rechargeable battery pack 100 underneath handle 315, the operation of hand-held power tool 300 is not interfered with.

The locking means, which are not represented in detail, include, inter alia, a locking element and an actuating element 220. By way of the actuation of actuating means 220, rechargeable battery pack 100 may be released from handle 315 of hand-held power tool 300. Furthermore, hand-held power tool 300 includes an interface 380.

Rechargeable battery pack 100 represented in FIG. 1 is designed as a sliding rechargeable battery pack, and includes an interface 180 corresponding to interface 380 of hand-held power tool 300. Alternatively to the sliding rechargeable battery pack, an embodiment as a rotary or swivel rechargeable battery pack is also possible, rechargeable battery pack 100 being releasably lockable on housing 305 of hand-held power tool 300 on the side opposite the swivel axis by latching, screwing, clamping, or bracing. In this way, the rechargeable battery pack may be effectively prevented from possibly falling off of housing 305.

For the releasable mounting of rechargeable battery pack 100 on a hand-held power tool 300 or on a charging device, rechargeable battery pack 100 includes an interface 180 for the releasable mechanical and electrical connection to a corresponding interface 380 of hand-held power tool 300 or a corresponding interface of the charging device. During the mounting of rechargeable battery pack 100, receiving means, e.g., guide grooves and guide ribs, of hand-held power tool 300 or of the charging device are brought into engagement with rechargeable battery pack 100 in order to accommodate the corresponding guide elements of the rechargeable battery pack, rechargeable battery pack 100 being inserted along the receiving means and interface 180 of rechargeable battery pack 100 being slid into corresponding interface 380 of hand-held power tool 300 or the corresponding interface of the charging device. Rechargeable battery pack 100 may be assigned to hand-held power tool 300 and/or the charging device via interfaces 180, 380.

Figure 2:
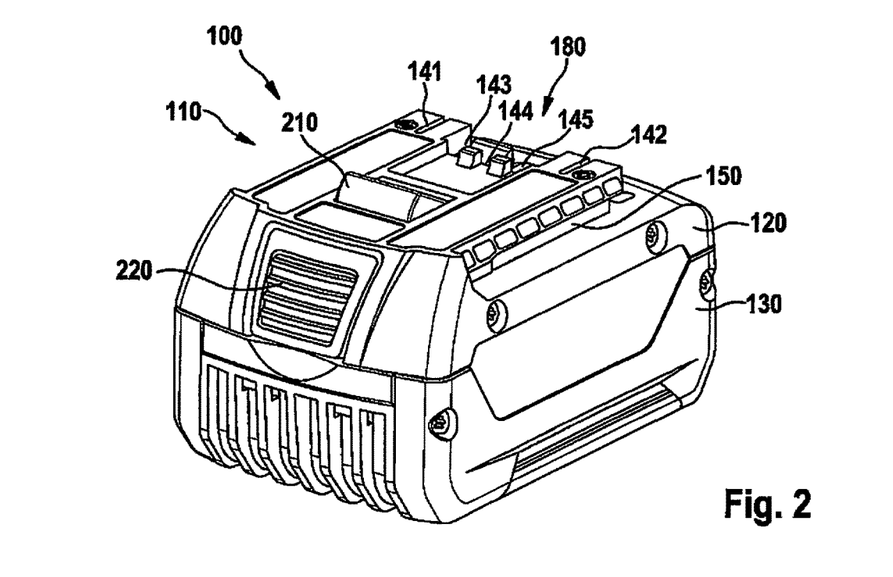
FIG. 2 shows a perspective representation of a rechargeable battery pack.
Figure 3:
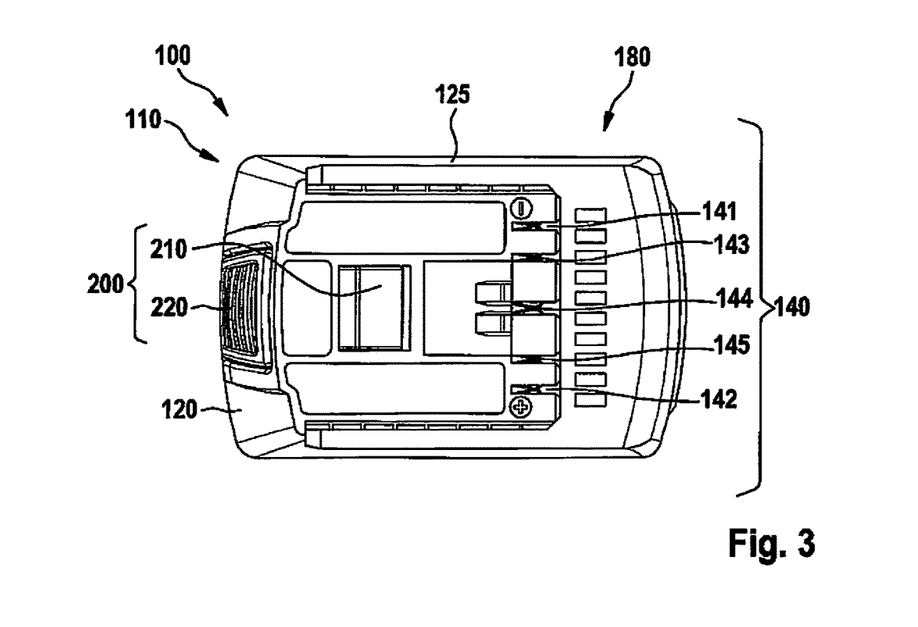
FIG. 3 shows a top view of the rechargeable battery pack from FIG. 3.

FIGS. 2 and 3 show different views of a rechargeable battery pack 100 from the related art, which may be utilized in a tool system according to the present invention. This rechargeable battery pack includes a housing 110 made up of a first housing component 120 and a second housing component 130, the housing in the represented specific embodiment accommodating at least one and, as represented here, however, a plurality of parallel- or series-connected battery cells between first housing component 120 and second housing component 130. The battery cells are preferably positioned between the two housing components 120, 130 either with the aid of a cell holder or with the aid of cardboard sleeves for insulating the battery cells with respect to one another. In the embodiment variant represented, rechargeable battery pack 100 is configured as a sliding rechargeable battery pack.

For the releasable mounting of rechargeable battery pack 100 on hand-held power tool 300 or on charging device 700, rechargeable battery pack 100 includes an interface 180 for the mechanical and electrical connection to a corresponding interface 380 of hand-held power tool 300 or a corresponding interface 780 of charging device 700. During the mounting of rechargeable battery pack 100, receiving means, e.g., guide grooves and guide ribs, of hand-held power tool 300 or of charging device 700 are brought into engagement with rechargeable battery pack 100 in order to accommodate the corresponding guide elements of the rechargeable battery pack, rechargeable battery pack 100 being inserted along the receiving means in a contacting direction y, and interface 180 of rechargeable battery pack 100 being slid into corresponding interface 380 of hand-held power tool 300 or corresponding interface 780 of charging device 700. Rechargeable battery pack 100 may be assigned to interface 380, 780 of hand-held power tool 300 and/or charging device 700 via interfaces 180.

In the specific embodiment represented, interface 180 includes contact elements 140, which interact with corresponding counter-contact elements 740 of charging device 700 and/or corresponding counter-contact elements 340 of hand-held power tool 300 in order to transfer charging current and to exchange information between charging device 700 and/or hand-held power tool 300 and rechargeable battery pack 100.

In this case, a specific function, which is established and is not changeable, is assigned to each of the contact elements 140 of rechargeable battery pack 100. This specific function may be, for example, the transmission of a predefined piece of information in the form of a signal transmitted from a corresponding counter-contact element 740 of charging device 700 or corresponding counter-contact element 340 of hand-held power tool 300, or may be the contacting of an established electrical pole during the charging process.

Figure 4:
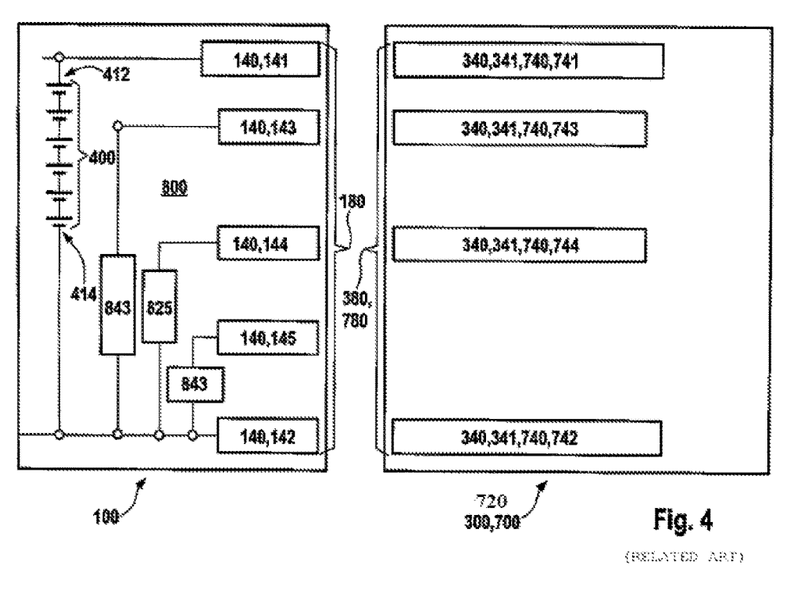
FIG. 4 shows a schematic representation of a circuit of a rechargeable battery pack and a charging device or a hand-held power tool according to the related art.

FIG. 4 schematically shows a circuit arrangement for a rechargeable battery pack 100 and a hand-held power tool 300 connected to rechargeable battery pack 100 and/or a connected charging device 700 according to the previous related art. Rechargeable battery pack 100 and charging device 700 and hand-held power tool 300 are connected to each other via particular device-side interfaces 180, 380, 780. Contact elements 140 specifically include a first contact element 141 and a second contact element 142, at which the electrical positive pole and the electrical negative pole are present during the charging process. These two contact elements 141, 142 are configured as voltage contact elements and are used as charging and/or discharging contact elements. Moreover, a third contact element 143, a fourth contact element 144, and a fifth contact element 145 are evident, which are configured as signal contact elements and are used for the transmission of signals from rechargeable battery pack 100 to hand-held power tool 300 or charging device 700 and/or from hand-held power tool 300 or charging device 700 to rechargeable battery pack 100. In the specific embodiment shown, third contact element 143, fourth contact element 144, and fifth contact element 145 are configured for contacting a third counter-contacting element 743, a fourth counter-contacting element 744, and a fifth counter-contacting element of charging device 700, and/or a third counter-contacting element, a fourth counter-contacting element, and a fifth counter-contacting element of hand-held power tool 300, via which information regarding various battery system parameters or operating parameters of rechargeable battery pack 100 are transmitted to a charging electronics system 720 of charging device 700 and/or to a controller 370 of hand-held power tool 300.

Within rechargeable battery pack 100, first contact element 141 leads to a first positive terminal pole 412 of a battery cell system 400, and second contact element 142 leads to a second negative terminal pole 414. Both third contact element 143 and fifth contact element 145 are connected via a coding element 843 in the form of a coding resistor to a ground connection, which, in turn, is connected to second negative terminal pole 414 of rechargeable battery pack 100, as represented in the figures. By way of the selection of coding element 843 and its capacitances, it is possible to encode information regarding the type of battery cells. The means for detecting the resistance values of the coding resistors may be implemented, for example, in the form of a voltage measuring device, a DC voltage measuring device in the case of an ohmic coding resistor, and an AC voltage measuring device in the case of an RC element as a coding resistor, a voltage divider being formed, for example, from the particular coding resistor and one further measuring auxiliary resistor, to which an electrical voltage is applied, a DC voltage in the case of an ohmic coding resistor, or an AC voltage in the case of an RC element. In this case, a voltage between a coding resistor and the measuring shunt is measured relative to ground and the resistance value of the coding resistor is inferred via the measured voltage. The type of rechargeable battery pack 100 may then be ascertained on this basis. Fourth contact element 144 is connected to second negative terminal pole 414 of rechargeable battery pack 100 via a temperature-dependent control element 825 in the form of a temperature sensor having a ground connection.

With respect to charging device 700 and hand-held power tool 300, only interfaces 380, 780 to counter-contact elements 340, 740 are schematically depicted. Counter-contact elements 340, 740 are situated correspondingly to contact elements 140 of rechargeable battery pack 100, so that charging device 700 includes five counter-contact elements, and hand-held power tool 300 also includes five counter-contact elements.

Four different embodiment variants of circuit arrangements within a rechargeable battery pack 100 according to the present invention are represented in FIGS. 5 through 8. The embodiment variants of the present invention described in greater detail in the following differ from the specific embodiment of the previous related art represented in FIG. 4 in that, in particular, rechargeable battery pack 100 includes a microcontroller 820. Microcontroller 820 is connected to rechargeable battery pack electronics system 800 in such a way that it detects when information is called up at one of the signal contact elements 143, 144, 145, in particular at a contact element 143, 145 of hand-held power tool 300 and/or charging device 700, which is connected to one of the coding elements 843. Furthermore, microcontroller 820 is connected to rechargeable battery pack electronics system 800 in such a way that the information provided at one of the signal contact elements 143, 144, 145 may be influenced by microcontroller 820.

Figure 5:
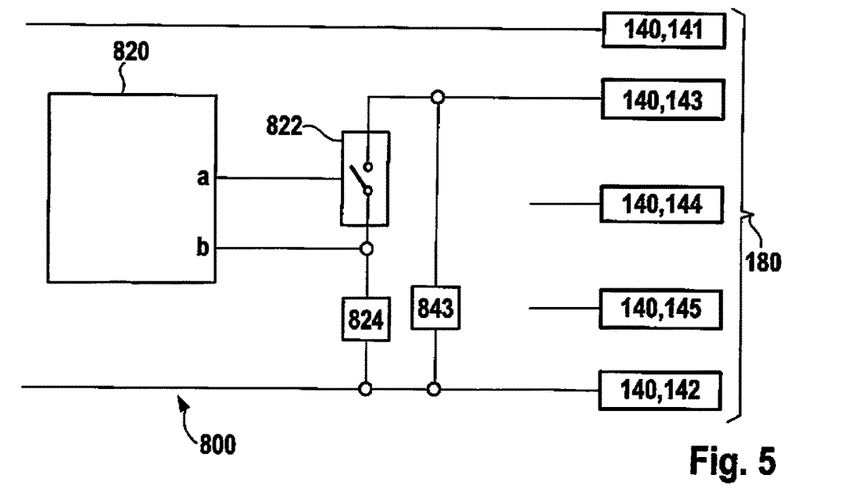
FIG. 5 shows a schematic representation of a first variant of a circuit arrangement of a rechargeable battery pack according to the present invention.

FIG. 5 shows, in detail, one first embodiment variant of a circuit arrangement for a rechargeable battery pack 100 according to the present invention, microcontroller 820 controlling a switching element 822, preferably a semiconductor switch or a relay, via a first node a. Switching element 822 allows microcontroller 820 to switch the signal transmitted from hand-held power tool 300 or charging device 700 via third contact element 143 in parallel to a measuring auxiliary resistor 824 and to measure the signal there via a second node b. In this case, it is possible that microcontroller 820 influences the transmitted signal via second node b.

Third contact element 143 does not have to also be the contact element which has a connection to coding element 843, as in the represented embodiment variant. Alternatively, it is also conceivable that third contact element 143 has a connection to another similarly transmitted signal, for example, the signal from temperature sensor 825, which, in the variant represented in FIG. 5, is connected to fourth contact element 144, but is not represented in detail.

Figure 6:
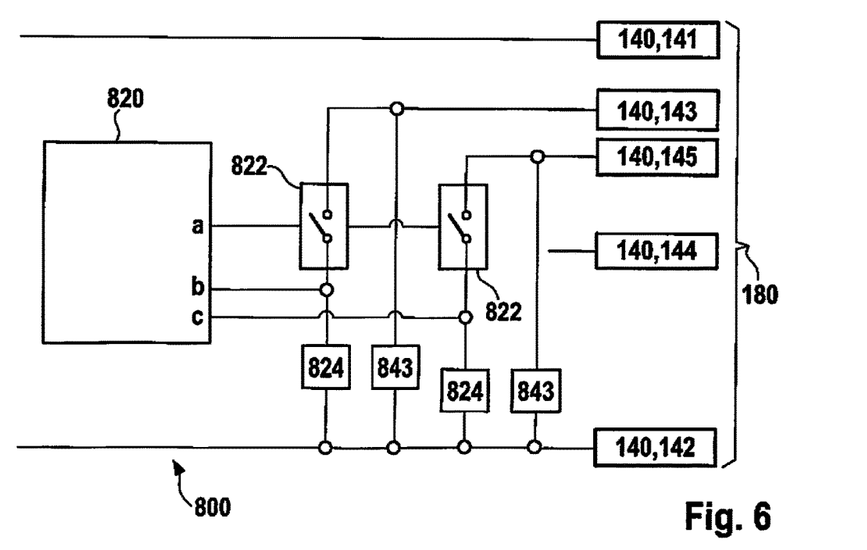
FIG. 6 shows a schematic representation of a second variant of a circuit arrangement of a rechargeable battery pack according to the present invention.

In FIG. 6, in a second embodiment variant of a circuit arrangement of a rechargeable battery pack 100 according to the present invention, microcontroller 820 includes a third node c in addition to first node a and second node b. Microcontroller 820 may communicate with third and fifth contact elements 143, 145 and, therefore, also with coding elements 843 connected thereto, and with hand-held power tool 300 or charging device 700 via the different nodes a, b, c. In this case, particular switching elements 822 may be controlled via the same first node a. Furthermore, the second embodiment variant includes two measuring auxiliary resistors 824. The two switching elements 822 further allow microcontroller 820 to switch the signals transmitted from hand-held power tool 300 or charging device 700 via third and fifth contact elements 143, 145 in parallel to the two measuring auxiliary resistors 824 and to measure the signals there via second and third nodes b, c. In this case, it is possible that microcontroller 820 influences the transmitted signals via the two nodes b, c.

Figure 7:
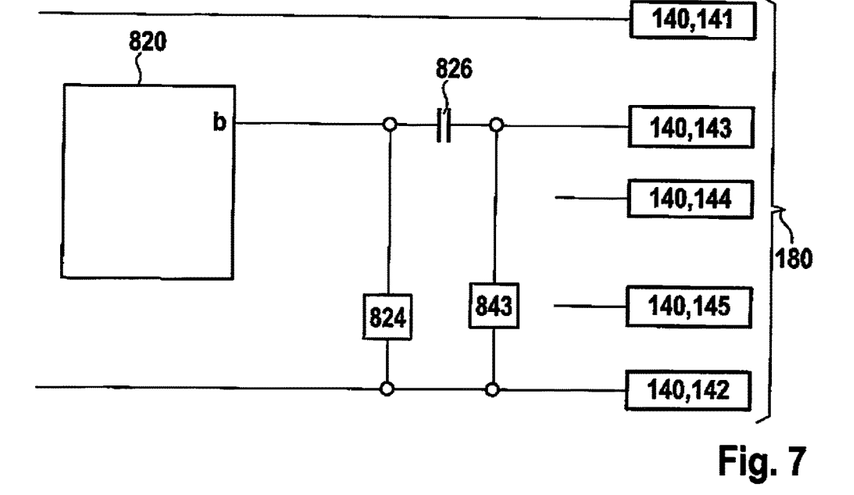
FIG. 7 shows a schematic representation of a third variant of a circuit arrangement of a rechargeable battery pack according to the present invention.

In contrast to the first embodiment variant, in the third embodiment variant of a circuit arrangement of a rechargeable battery pack 100 according to the present invention, which is represented in FIG. 7, a disconnection or connection of microcontroller 820 does not take place via a switching element 822, but rather via a capacitor 826. Advantageously, capacitor 826 has the property of representing a disconnection for DC signals, but of allowing higher-frequency signals to pass through. A downward compatibility with one of the conventional (low-frequency) interfaces 380, 780 of a conventional hand-held power tool 300 or a conventional charging device 700 may therefore be ensured, it being possible for the additional signal transmission to take place in a higher frequency range, for example, a frequency range greater than 1 KHz. Moreover, further details of the charging and discharging process may be read out from microcontroller 820 of rechargeable battery pack 100 via capacitor 826 and, for example, suitable control commands may be triggered and/or these control commands may be transmitted to hand-held power tool 300 or charging device 700.

Figure 8:
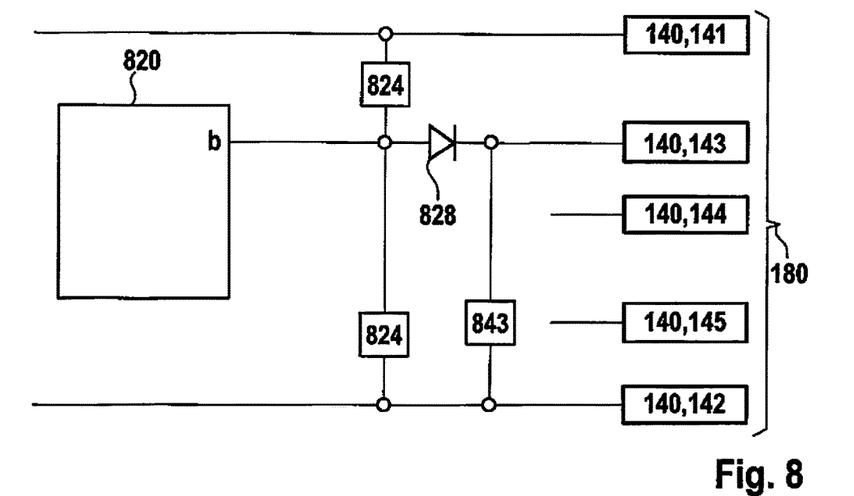
FIG. 8 shows a schematic representation of a fourth variant of a circuit arrangement of a rechargeable battery pack according to the present invention.

In contrast to the first and third embodiment variants, in the fourth embodiment variant of a circuit arrangement of a rechargeable battery pack 100 according to the present invention represented in FIG. 8, a disconnection or connection of microcontroller 820 does not take place via a switching element 822, but rather via a diode 828. Conventional hand-held power tools 300 or conventional charging devices 700 may query a coding element 843 with the aid of a positive voltage. In the case in which hand-held power tool 300 or charging device 700 switches a low voltage, e.g., 0.2 V, to third contact element 143, a current flows through diode 828. This current may be manipulated by hand-held power tool 300 and/or charging device 700, for example, via switching on and off, and may be subsequently measured by microcontroller 820, and may also be manipulated by microcontroller 820 by way of second node b being changed, for example, from a high circuit to a low circuit. Furthermore, the fourth embodiment variant includes two measuring auxiliary resistors 824. Advantageously, this auxiliary circuit is configured in such a way that a voltage which is damaging to microcontroller 820 is never present at microcontroller 820 via second node b.

As described above, microcontroller 820 may influence the information provided at one of signal contact elements 143, 144, 145 by short-circuiting coding element 843 to ground and may collect data regarding rechargeable battery pack 100, in particular regarding the operation of rechargeable battery pack 100, and store these data in an integrated memory. Furthermore, the data from the integrated memory may be output to a control unit 370 of hand-held power tool 300 and/or a charging electronics system 720 of charging device 700 in the form of the information provided at signal contact elements 143, 144, 145, the data stored in the internal memory being at least partially redundant with the information stored in coding element 843. In this case, it is particularly advantageous that microcontroller 820 is configured for receiving the data from control unit 370 of hand-held power tool 300 and/or from charging electronics system 720 of charging device 700 and storing these data in the integrated memory.

In a tool system, which includes a rechargeable battery pack 100 according to the present invention, a charging device 700, and a hand-held power tool 300, each of which has a corresponding interface 380, 780 for the electrical and/or mechanical coupling to interface 180 of rechargeable battery pack 100, charging electronics system 720 of charging device 700 and/or control unit 370 of hand-held power tool 300 are/is configured for evaluating the data received from rechargeable battery pack 100 and sending control commands, which are at least partially based on the evaluation of the received data, to rechargeable battery pack 100. In the case in which, for example, the transmitted data allow for the detection of an unsafe state of rechargeable battery pack 100 or a state which could result in an unsafe state of rechargeable battery pack 100, the present invention describes the possibility that a control command output by charging electronics system 720 of charging device 700 and/or control unit 370 of hand-held power tool 300 effectuates a permanent or temporary blocking of the rechargeable battery pack.

The gathered and stored data may relate to present operating states, in particular individual cell voltages, and/or to the progress of operating states of rechargeable battery pack 100, in particular a number of charge cycles. Furthermore, the term "operating states" is to be understood to mean different battery system parameters or operating parameters, i.e., in particular, one of the parameters of end-point voltage, end-of-charge voltage, the present temperature of rechargeable battery pack 100, the number of cells of rechargeable battery pack 100, the number of parallel- or series-connected cells, utilized chemicals of the cells of rechargeable battery pack 100, and/or the power class of rechargeable battery pack 100. In this case, the power class of rechargeable battery pack 100 includes a voltage output by rechargeable battery pack 100 and a current carrying capacity of rechargeable battery pack 100, and an electrical capacitance of rechargeable battery pack 100.

In addition to the described and illustrated specific embodiments, further specific embodiments are conceivable, which may include further modifications and combinations of features.

What is claimed is:

1. A rechargeable battery pack for a hand-held power tool, comprising:
   at least one interface for establishing a mechanical and electrical connection of the rechargeable battery pack to either a hand-held power tool or a charging device, the interface including contact elements for at least one of the electrical and mechanical contacting of at least one of corresponding counter-contact elements on the hand-held power tool and corresponding counter-contact elements on the charging device, at least one contact element being a signal contact element, which is electrically connected to a coding element of the rechargeable battery pack;

a rechargeable battery pack electronics system, the rechargeable battery pack electronics system being configured for providing information regarding the rechargeable battery pack via the signal contact element, the information regarding the rechargeable battery pack being stored at least in part in the coding element; and a microcontroller connected to the rechargeable battery pack electronics system, wherein the coding element is a coding resistor configured for storing information regarding the rechargeable battery pack, wherein the microcontroller is connected to the rechargeable battery pack electronics system and configured such that the information provided at the signal contact element is influenced by the microcontroller, wherein at least one of the hand-held power tool and the charging device is configured to supply the coding element with current for a measurement, and a resistance value of the coding resistor is ascertainable via a measured voltage, the microcontroller is configured to control a switching element via a first node, wherein the switching element is configured to allow the microcontroller to switch a signal transmitted from at least one of the hand-held power tool and the charging device in parallel to a measuring auxiliary resistor and to measure the signal there via a second node.

2. The rechargeable battery pack as recited in claim 1, wherein the rechargeable battery pack electronics system is configured such that the microcontroller influences the information provided at the signal contact element by short-circuiting the coding element to ground.

3. The rechargeable battery pack as recited in claim 1, wherein the microcontroller is configured for gathering data regarding operation of the rechargeable battery pack, and storing these data in a memory integrated into the rechargeable battery pack.

4. The rechargeable battery pack as recited in claim 3, wherein the gathered and stored data relate to at least one of present individual cell voltages, progress of operating states of the rechargeable battery pack, and a number of charge cycles.

5. The rechargeable battery pack as recited in claim 3, wherein the microcontroller is configured for outputting data from the integrated memory, in the form of information provided at the signal contact element, to at least one of a control unit of the hand-held power tool and a charging electronics system of the charging device.

6. The rechargeable battery pack as recited in claim 3, wherein the data are at least partially redundant with the information stored in the coding element.

7. The rechargeable battery pack as recited in claim 3, wherein the microcontroller is configured for receiving data at least one of: from a control unit of the hand-held power tool, and from a charging electronics system of the charging device, and storing these data in the integrated memory.

8. The rechargeable battery pack as recited in claim 7, wherein the data are stored at least one of at an established address and flexibly in the memory.

9. The rechargeable battery pack as recited in claim 3, wherein the microcontroller is configured for receiving, via the signal contact element, control commands related to the rechargeable battery pack at least one of: from the control unit of the hand-held power tool, and from the charging electronics system of the charging device, and storing these control commands in the integrated memory.

10. A tool system, comprising:

a rechargeable battery pack including at least one interface for establishing a mechanical and electrical connection of the rechargeable battery pack to either a hand-held power tool or hand-held power tool and a charging device, the interface including contact elements for at least one of the electrical and mechanical contacting of at least one of corresponding counter-contact elements on the hand-held power tool and corresponding counter-contact elements on the charging device, at least one contact element being a signal contact element, which is electrically connected to a coding element of the rechargeable battery pack, a rechargeable battery pack electronics system, the rechargeable battery pack electronics system being configured for providing information regarding the rechargeable battery pack via the signal contact element, the information regarding the rechargeable battery pack being stored at least in part in the coding element, and a microcontroller connected to the rechargeable battery pack electronics system and configured to detect;

a hand-held power tool including an interface for at least one of an electrical and mechanical coupling of the rechargeable battery pack to the hand-held power tool; and a charging device including an interface for at least one of an electrical and mechanical coupling of the rechargeable battery pack to the charging device, the coding element is a coding resistor configured for storing information regarding the rechargeable battery pack, wherein the microcontroller is connected to the rechargeable battery pack electronics system and configured such that the information provided at the signal contact element is influenced by the microcontroller, wherein at least one of the hand-held power tool and the charging device is configured to supply the coding element with current for a measurement, and a resistance value of the coding resistor is ascertainable via a measured voltage, the microcontroller is configured to control a switching element via a first node, wherein the switching element is configured to allow the microcontroller to switch a signal transmitted from at least one of the hand-held power tool and the charging device in parallel to a measuring auxiliary resistor and to measure the signal there via a second node.

11. The tool system as recited in claim 10, wherein at least one of: (i) the charging device includes a charging electronics system, and (ii) the hand-held power tool includes a control unit, at least one of the charging electronics system and the control unit being configured for at least one of receiving and sending data at least one of from an integrated memory of the rechargeable battery pack and information regarding the rechargeable battery pack, via the signal contact element.

12. The tool system as recited in claim 10, wherein at least one of the charging electronics system of the charging device and the control unit of the hand-held power tool, is designed for evaluating the received data and sending control commands to the rechargeable battery pack.

13. The tool system as recited in claim 12, wherein the control commands are at least partially based on the evaluation of the received data.

14. The tool system as recited in claim 12, wherein a control command output by at least one of the charging electronics system of the charging device and the control unit of the hand-held power tool, effectuates a permanent or temporary blocking of the rechargeable battery pack.

15. The tool system as recited in claim 10, wherein the information transmitted via the signal contact element relate to at least one of the parameters of: end-point voltage of the rechargeable battery pack, power class of the rechargeable battery pack, end-of-charge voltage of the rechargeable battery pack, number of cells of the rechargeable battery pack, or utilized cell chemicals of the rechargeable battery pack.

16. The rechargeable battery pack as recited in claim 1, wherein the microcontroller is configured to communicate with the signal contact element.

* * * * *